United States Patent
Lard

(10) Patent No.: US 9,784,297 B2
(45) Date of Patent: Oct. 10, 2017

(54) THREADED FASTENING ELEMENT

(71) Applicant: FAURECIA INTERIEUR INDUSTRIE, Nanterre (FR)

(72) Inventor: Frédéric Lard, St. Martin le Noeud (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/913,360

(22) PCT Filed: Sep. 1, 2014

(86) PCT No.: PCT/EP2014/068496
§ 371 (c)(1),
(2) Date: Feb. 20, 2016

(87) PCT Pub. No.: WO2015/028661
PCT Pub. Date: Mar. 5, 2015

(65) Prior Publication Data
US 2016/0201711 A1    Jul. 14, 2016

(30) Foreign Application Priority Data
Aug. 30, 2013   (FR) ..................... 13 58348

(51) Int. Cl.
*F16B 35/04*     (2006.01)
*F16B 37/00*     (2006.01)
(Continued)

(52) U.S. Cl.
CPC ........ *F16B 37/002* (2013.01); *F16B 25/0021* (2013.01); *F16B 25/0047* (2013.01);
(Continued)

(58) Field of Classification Search
CPC .............. F16B 25/0042; F16B 25/0047; F16B 25/0057
(Continued)

(56) References Cited

U.S. PATENT DOCUMENTS 3,643,543 A * 2/1972 Gutshall ............. F16B 25/0047
411/418
4,538,940 A * 9/1985 Isler .................... E21D 21/0006
405/244

(Continued)

FOREIGN PATENT DOCUMENTS

DE   3117624 A1   1/1983
DE   3929332 A1   3/1991
(Continued)

OTHER PUBLICATIONS

International Search Report corresponding to International application No. PCT/EP2014/068496, dated Jan. 12, 2014, 3 pages.
(Continued)

*Primary Examiner* — Gary Estremsky
(74) *Attorney, Agent, or Firm* — Reising Ethington P.C.

(57) ABSTRACT

This threaded fastening element (2) comprising a threading (14) extending along a central axis (A), the threading (14) having at least one screw thread having an apical angle decreasing gradually, continuously and monotonously, between a first apical angle ($α1$) and a second apical angle ($α2$) strictly smaller than the first apical angle. The threaded fastening element is a screw or a nut.

18 Claims, 1 Drawing Sheet

(51) Int. Cl.
*F16B 25/00* (2006.01)
*F16B 25/10* (2006.01)

(52) U.S. Cl.
CPC ........ *F16B 25/0057* (2013.01); *F16B 25/103* (2013.01); *F16B 25/106* (2013.01); *F16B 37/00* (2013.01)

(58) Field of Classification Search
USPC .......................................... 411/411, 436, 415
See application file for complete search history.

(56) References Cited

U.S. PATENT DOCUMENTS 5,120,171 A * 6/1992 Lasner ................. A61B 17/863
411/308
6,000,892 A * 12/1999 Takasaki ............. F16B 25/0015
411/187
8,770,903 B2 7/2014 Ambros
2015/0010375 A1 1/2015 Schraer et al.

FOREIGN PATENT DOCUMENTS

| | | |
|---|---|---|
| DE | 19956906 A1 | 6/2001 |
| DE | 202012001847 U1 | 3/2012 |
| DE | 102010043589 A1 | 5/2012 |
| GB | 2235744 A | 3/1991 |

OTHER PUBLICATIONS

Written Opinion (in French) corresponding to International application No. PCT/EP/2014/068496, dated Jan. 2014, 5 pages.
French Search Report for application FR 1358348, dated Apr. 29, 2014, 3 pages.

* cited by examiner

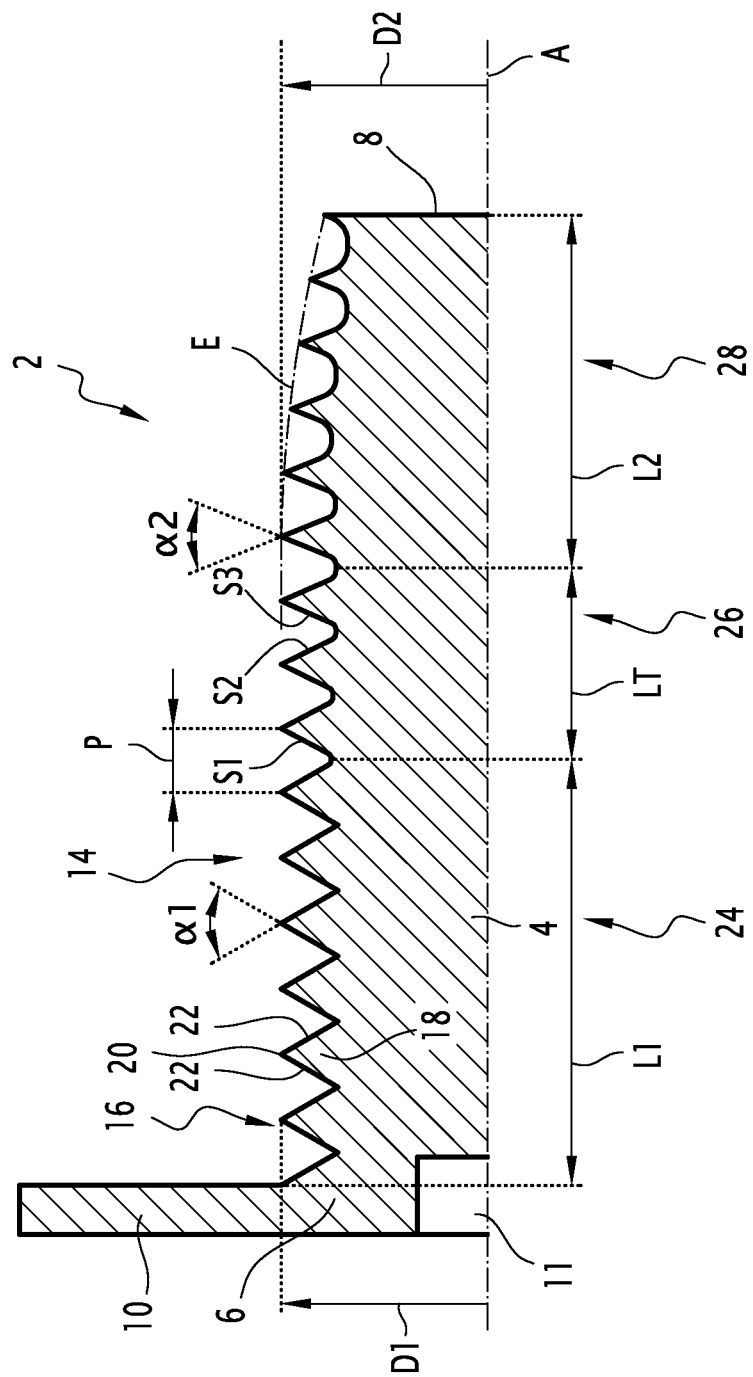

THREADED FASTENING ELEMENT

TECHNICAL FIELD OF THE INVENTION

The present invention relates to a threaded fastening element, in particular for the mechanical fastening of pieces of equipment of a vehicle, in particular an automotive vehicle.

BACKGROUND OF THE INVENTION

US2004/0081535A1 discloses a screw comprising a screw head and a tapered tip, the screw having a thread extending over a rear segment adjacent to the screw head, the thread being asymmetrical and inclined opposite the screw head, and a thread extending over a front segment adjacent to the tip of the screw, the thread being asymmetrical and inclined toward the screw head.

SUMMARY OF THE INVENTION

One of the aims of the invention is to provide a self-tapping or self-forming threaded fastening element that can be screwed easily while effectively retaining the parts that it keeps together.

To that end, the invention proposes a threaded fastening element comprising a threading extending along a central axis, the threading having at least one screw thread, wherein said screw thread has an apical angle decreasing gradually, continuously and monotonously, between a first apical angle and a second apical angle strictly smaller than the first apical angle.

According to other embodiments, the fastening element comprises one or more of the following features, considered alone or according to any technically possible combinations:
- the decrease in the apical angle occurs over at least one turn, in particular several turns;
- the decrease in the apical angle occurs with a constant pitch between the turns of the screw thread;
- the threading comprises at least one variation segment over which the decrease in the apical angle occurs, and at least one other segment over which the screw thread has a constant apical angle;
- the threading comprises a first segment extending from the variation segment and over which the thread has a constant apical angle equal to the first apical angle;
- the thread has at least one turn over the first segment, in particular several turns;
- the first segment has a constant diameter or a diameter increasing gradually moving away from the variation segment;
- the screw thread has a constant pitch over the first segment;
- the threading comprises a second segment extending from the variation segment and over which the screw thread has a constant apical angle equal to the second apical angle;
- the screw thread has at least one turn over the second segment, in particular several turns;
- the screw thread has a constant pitch over the second segment;
- the diameter of the second segment decreases gradually moving away from the variation segment;
- the variation segment is an end segment of the threading;
- the apical angle decreases gradually, continuously and monotonously, between the first apical angle and the second apical angle over the entire length of the threading;
- the threaded fastening element is a screw and comprises a threaded shank, the threading being an outer threading formed on the threaded shank, or is a nut, the threading being an inner threading formed inside the nut.

BRIEF DESCRIPTION OF THE DRAWINGS

The invention and its advantages will be better understood upon reading the following description, provided solely as an example, and done in reference to the sole FIGURE illustrating a half-sectional view of a threaded fastening element in the form of a screw.

DETAILED DESCRIPTION OF THE ILLUSTRATED EMBODIMENT

The threaded fastening element shown in the FIGURE is a screw 2 comprising a threaded shank 4 extending along a central axis A. The shank 4 extends between a first end 6 and a second end 8.

The screw 2 comprises a screw head 10 secured to the shank 4. The screw head 10 is connected to the first end 6. The second end 8 opposite the screw head 10 is free.

The screw head 10 is configured to rotate the screw 2 around the central axis A using a screwing tool.

To that end, the screw head 10 comprises a cavity 11 with a cruciform, hexagonal or multi-lobed contour. As shown in the FIGURE, the cavity 11 extends partially inside the shank 4.

Other driving reliefs formed hollowly in the screw head 10 can be considered. The cavity 11 can be replaced by a slot.

Alternatively or optionally, the screw head 10 comprises an outer contour provided to cooperate with a tool. The screw head 10 for example has a hexagonal outer contour.

The screw 2 has a threading 14 formed on the outer surface of the shank 4. The threading 14 extends along the central axis A. The threading 14 comprises at least one continuous screw thread extending in a helix around the central axis A, here a single screw thread 16.

Seen in section, the screw thread 16 has a base 18, an apex 20 and two flanks 22, each flank 22 extending between the base 18 and the apex 20. The two flanks 22 of the screw thread 16 converge from the base 18 toward the apex 20. The two flanks 22 converge toward the apex 20 while forming an angle referred to as the "apical angle" of the screw thread 16 between them.

The profile of the screw thread 16 designates its contour seen in section. The screw thread 16 here has a triangular profile. The two flanks 20 come together while substantially forming a tip.

The screw thread 16 has several turns. One turn corresponds to a complete revolution of the screw thread around the central axis A. In the FIGURE, each turn corresponds to a tooth.

The screw thread 16 has an apical angle decreasing gradually, continuously and monotonously, between a first apical angle $\alpha 1$ and a second apical angle $\alpha 2$ strictly smaller than the first apical angle.

The decrease in the apical angle is preferably done over at least one turn, in particular over several turns. Here it is done over three turns S1, S2, S3.

The threading 14 for example comprises a segment over which the decrease in the apical angle occurs, and at least one other segment over which the screw thread has a constant apical angle.

In the illustrated example, the threading 14 comprises, along the central axis A, consecutively, a first segment 24, followed by a variation segment 26, followed by a second segment 28. Each of the first segment 24, the second segment 28 and the variation segment 26 extends axially over a respective portion of length of the threading 14.

The first segment 24 extends from the variation segment 26 toward the first end 6. The first segment 24 extends from the variation segment 26 axially toward the first end 6. The screw thread 16 extends continuously over the first segment 24 and the variation segment 26.

The second segment 28 extends from the variation segment 26 toward the second end 8. The second segment 28 extends from the variation segment 26 axially toward the second end 8. The screw thread 16 extends continuously over the variation segment 26 and the second segment 28.

The apical angle of the screw thread 16 is constant over the first segment 24 and equal to a first apical angle α1. The screw thread 16 has several turns over the first segment 24. The apical angle of the screw thread 16 is constant over the first segment 24.

The apical angle of the thread 16 is constant over the second segment 28 and equal to a second apical angle α2 strictly smaller than the first apical angle α1. The screw thread 16 has several turns over the second segment 28. The apical angle of the screw thread 16 is constant over the second segment 28.

The screw thread 16 has, over the variation segment 26, an apical angle α decreasing gradually, continuously and monotonously, from the first apical angle α1 to the second apical angle α2 strictly smaller than the first apical angle α1.

The screw thread 16 comprises several turns over the variation segment 26, here three turns S1, S2, S3. The apical angle of the screw thread 16 varies from one turn to the next.

Over the variation segment 26, the apical angle of the turns S1, S2, S3 of the screw thread 16 decreases gradually considering the turns consecutively from the end of the variation segment 26 at which the screw thread 16 has the first apical angle, to the end of the variation segment 26 at which the screw thread 16 has the second apical angle.

Preferably, each of the turns S1, S2, S3 of the variation segment 26 has an apical angle strictly larger than that of the following turn considering the turns successively from the end of the variation segment 26 at which the screw thread 16 has the first apical angle, to the end of the variation segment 26 at which the screw thread 16 has the second apical angle.

In the illustrated example, the screw thread 16 has a first apical angle α1 of 60° and a second apical angle α2 of 44°. Over the variation segment 26, the screw thread 16 has an apical angle varying gradually from 60° to 44°.

The variation of the apical angle of the screw thread 16 is preferably constant. The apical angle variation is the variation of the apical angle based on the length traveled along the screw thread or the angle traveled around the central axis.

In the example of the FIGURE, the variation is 4° of apical angle per turn. The screw thread 16 has three turns S1, S2, S3 over the variation segment 26, having respective apical angles of 56°, 52° and 48° while traveling the turns S1, S2, S3 from the first segment 24 toward the second segment 28.

The pitch P of the screw thread 16 is the axial distance, considered along the central axis L, between the apices of two consecutive turns of the screw thread 16.

The screw thread 16 here has a constant pitch P over each of the first segment 24, the variation segment 26 and the second segment 28. The pitch P of the screw thread 16 is constant over the entire length of the threading 14. Alternatively, the pitch of the screw thread varies from one segment to the next and/or along at least one segment.

The diameter of the threading 14 corresponds to the diameter of the fictitious envelope passing through the apices of the screw thread 16 forming the threading.

The second segment 28 of the threading 14 here has an outer diameter D2 decreasing as it moves away from the variation segment 26. The threaded shank 4 therefore has a tapering free end. Seen from the side, the apices of the turns adjacent to the free end situated on one side of the central axis A follow a curve E with a concave side turned toward the central axis A. The curve here has a constant curve radius.

In the illustrated example, the first segment 24 of the threading 14 has an outer diameter D1 that is constant over the first segment 24. The variation segment 26 also has a constant diameter, equal to the diameter D1 of the first segment 24.

Alternatively, the threading 14 has an evolving diameter, which increases as it moves along the threading 14, from its part having the second apical angle toward its part having the first apical angle, i.e., moving from the second end 8 toward the first end 6 of the screw 2. The diameter increases over the entire length of the threading or over one or more segments of variable diameter alternating with one or more segments of constant diameter.

In one specific embodiment, the threading 14 has a variation segment 26 with a constant diameter and a first segment 24 with an increasing diameter moving away from the variation segment 26. The increase in diameter is for example from approximately 0.05 to 0.2 mm, in particular from 0.05 to 0.01 mm of the first segment 24. This increase in diameter makes it possible to perform a screw thread braking function, i.e., a maintenance of the tightening torque of the screw over time, in particular when the parts assembled using the screw are subject to vibrations.

In another specific embodiment, the threading 14 has a variation segment 26 having a diameter that varies over the variation segment 26, and more specifically that increases moving along the variation segment 26 from the part of the threading 14 having a second apical angle toward the part of the threading 14 having the first apical angle. The threading 14 has no first segment or has a first segment 24 with a constant diameter or with a diameter increasing in the same direction as the variation segment 26.

In the illustrated example, the screw thread 16 is symmetrical: the two flanks 20 of the screw thread 16 extend symmetrically on either side of a transverse plane perpendicular to the central axis passing through the apex of the thread 16. Each flank 20 forms an angle with this plane substantially equal to half of the apical angle of the screw thread 16. The screw thread 16 is symmetrical over the variation segment 26, over the first segment 24 and/or the second segment 28.

Alternatively, the screw thread is asymmetrical: two flanks of the screw thread form different respective angles with a transverse plane perpendicular to the central axis and passing through the apex of the screw thread. In this case, the screw thread is asymmetrical over the variation segment, the first segment and/or the second segment.

The screw 2 is a self-tapping or self-forming screw able to form, during the first screwing, a tapping (or inner threading) in the material of the inner surface of orifices of parts which are in register and in which the screw 2 is screwed. The tapping is formed with a removal of material (self-tapping screw) or by deformation without a removal of material (self-forming screw).

During the first screwing, the material of the orifice is pushed back by the screw thread 16 of the screw. The screw 2 is inserted by its tip, such that the tapping is formed successively by the second segment 28, the variation segment 26 and the first segment 24.

Due to the small second apical angle, the screw thread 16 easily penetrates the material of the inner surface of the orifice during the initiation of the screwing, which makes this operation easier. The variation of the apical angle, here over the variation segment 26, makes it possible to produce a gradual variation between the second apical angle and the first apical angle, which facilitates the complete screwing of the screw for an operator. The tapping is formed gradually. A first segment 24 on which the screw thread has a larger apical angle makes it possible to ensure fastening with a high residual torque. Thus, the self-tapping screw 2 is easily screwed while ensuring reliable and lasting fastening of the parts that it keeps together. The tapered free end of the screw 2 facilitates its insertion and centering at the beginning of the screwing. The combination of the gradual variation between the second apical angle and the first apical angle with the gradual variation of the diameter of the free end of the screw 2 makes it possible to decrease the formation torque of the screw thread in the parts in which the screw is screwed.

The screw is in particular suitable for screwing in metal sheets. Parts joined by the screw are for example pieces of vehicle equipment, in particular motor vehicle equipment. A part is for example a dashboard crosspiece, another part for example being a front lateral upright (or A upright), a windscreen lower crosspiece or a firewall separating the passenger compartment and the engine compartment. In one specific embodiment, the screw is a self-forming metal screw.

Advantageously, the threading 14 is, in the first segment 24 having the first apical angle $\alpha 1$, of the metric (or isometric) type. The first apical angle is equal to 60°. The threading 14 is triangular: the or each screw thread 16 has a triangular profile. Preferably, the first segment extends over several turns and/or has a constant diameter. The isometric threading 14 on the first segment makes it possible to easily form an isometric tapping during the first screwing of the screw 2. The isometric threading thus formed makes it possible, if necessary, to replace the screw 2 with a commercially available screw with an isometric threading.

The first segment extends over a first length L1, the variation segment extends over a length LT and the second segment extends over a second length L2.

In one example embodiment, the variation length LT is smaller than the first length L1 and the second length L2. The first length L1 and the second length L2 are for example substantially identical. The first length L1 and the second length L2 are for example approximately 5 mm, the variation length LT being approximately 2 mm.

In the illustrated example, the variation segment 26 is an intermediate segment between the first segment 24 and the second segment 28.

Alternatively, the variation segment 26 is an end segment of the threading 14. In this case, the threading 14 has no first segment with a constant first apical angle $\alpha 1$ and/or second segment with a second constant apical angle $\alpha 2$.

In one specific embodiment, the threading 14 corresponds to that of the FIGURE, but has no second segment. The threading 14 comprises a first segment 24 with a first constant apical angle and a variation segment 26 with an apical angle varying progressively, continuously and monotonously, from the first apical angle $\alpha 1$ to a second apical angle $\alpha 2$ strictly smaller than the first apical angle, the variation segment 26 ending the threading 14.

In one example embodiment of the threading without a second segment, the second length L2 is zero, and the variation length LT is for example greater than or equal to the first length L1.

In one particular embodiment, the threading 14 exclusively comprises a variation segment over which the apical angle of the screw thread varies gradually, continuously and monotonously, from a first apical angle $\alpha 1$ to a second apical angle $\alpha 2$ strictly smaller than the first apical angle. In other words, the threading 14 has a screw thread whereof the apical angle decreases gradually, continuously and monotonously, from a first apical angle $\alpha 1$ to a second apical angle $\alpha 2$ strictly smaller than the first apical angle, over the entire length of the screw thread.

Preferably, as illustrated in the FIGURE, the apical angle of the threading 14 decreases from the screw head 10 toward the free end of the shank 4. The apical angle decreases over the variation segment 26 traveled by the screw head 10 toward the free end, the variation segment 26 optionally being extended by a first segment 24 over which the screw thread 16 has a constant apical angle equal to the first apical angle $\alpha 1$ and/or a second segment 28 over which the screw thread 16 has a constant apical angle equal to the second apical angle $\alpha 2$.

Preferably, as illustrated in the FIGURE, the shank 4 becomes narrower at its free end 8 while being truncated. Its diameter decreases gradually toward the free end 8 until it reaches a minimum non-zero diameter. The free end 8 has no tip. This makes it possible to obtain a compact screw while ensuring reliable and lasting screwing owing to the specific threading.

Advantageously, the threading 14 extends to the free end 8. The second segment 28, on which the threading 14 has a second constant apical angle, ends the threaded shank 14 at its free end 8, when such a second segment is provided, as in the FIGURE. Alternatively, the variation segment 26 ends the threaded shank 14 at its free end 8, when a second segment 28 is not provided.

The invention is not limited to a screw, but also applies to a nut, in which case, instead of being outer, the threading is inner.

Thus, the invention also relates to a nut comprising an inner threading extending along a central axis and having at least one variation segment in which the screw thread has an apical angle decreasing gradually, continuously and monotonously, between a first apical angle and a second apical angle strictly smaller than the first apical angle.

The nut is then advantageously self-tapping (or self-threading) or self-forming so as to form an outer threading on a shank on which the nut is screwed, during the first screwing, and allows an easy first screwing ensuring reliable and lasting fastening.

The invention is not limited to a threading comprising a single screw thread, but also applies to a threading comprising several parallel screw threads.

Thus, in general, a threaded fastening element has a threading comprising one or more screw threads, at least one screw thread having an apical angle decreasing gradually, continuously and monotonously, between a first apical angle and a second apical angle strictly smaller than the first apical angle.

The invention claimed is:

1. A threaded fastening element comprising a threading extending along a central axis, the threading having at least one screw thread, wherein said screw thread has an apical angle decreasing gradually, continuously and monotonously, between a first apical angle and a second apical angle strictly smaller than the first apical angle;

wherein the threading comprises at least one variation segment over which the decrease in the apical angle occurs, and at least one other segment over which the screw thread has a constant apical angle; and wherein the threading comprises a first segment extending from the variation segment and over which the screw thread has a constant apical angle equal to the first apical angle.

2. The threaded fastening element according to claim 1, wherein the decrease in the apical angle occurs with a constant pitch between the turns of the screw thread.

3. The threaded fastening element according to claim 1, wherein the first segment has a constant diameter or a diameter increasing gradually moving away from the variation segment.

4. The threaded fastening element according to claim 1, wherein the screw thread has a constant pitch over the first segment.

5. The threaded fastening element according to claim 1, wherein the threading comprises a second segment extending from the variation segment and over which the screw thread has a constant apical angle equal to the second apical angle.

6. The threaded element according to claim 5, wherein the screw thread has a constant pitch over the second segment.

7. The threaded fastening element according to claim 1, wherein the variation segment is an end segment of the threading.

8. The threaded fastening element according to claim 1, wherein the apical angle decreases gradually, continuously and monotonously, between the first apical angle and the second apical angle over the entire length of the threading.

9. The threaded fastening element according to claim 1, the threaded fastening element being a screw and comprises a threaded shank, the threading being an outer threading formed on the threaded shank.

10. The threaded fastening element according to claim 9, wherein the apical angle of the threading decreases from a first end of the shank to which a screw head is connected toward a second end of the shank that is free.

11. The threaded fastening element according to claim 9, wherein the shank has a free end that is tapered and truncated.

12. The threaded fastening element according to claim 9, wherein the screw is self-forming or self-tapping.

13. The threaded fastening element according to claim 1, the threaded fastening element being a nut, the threading being an inner threading formed inside the nut.

14. The threaded fastening element according to claim 1, wherein the first apical angle is equal to 60°.

15. The threaded fastening element according to claim 1, wherein the threading is triangular.

16. The threaded fastening element according to claim 1, wherein the decrease in the apical angle is done over several turns.

17. A threaded fastening element comprising a threading extending along a central axis, the threading having at least one screw thread, wherein said screw thread has an apical angle decreasing gradually, continuously and monotonously, between a first apical angle and a second apical angle strictly smaller than the first apical angle;

wherein the threading comprises at least one variation segment over which the decrease in the apical angle occurs, and at least one other segment over which the screw thread has a constant apical angle;

wherein the threading comprises a second segment extending from the variation segment and over which the screw thread has a constant apical angle equal to the second apical angle; and wherein the diameter of the second segment decreases gradually moving away from the variation segment.

18. A threaded fastening element comprising:

a shank that extends along a central axis from a first end to a second end; and a screw head fixed to the first end of the shank;

wherein the shank includes an outer surface comprising threading that includes a screw thread that extends along the central axis, and wherein the screw thread has an apical angle that decreases continuously over a plurality of turns of the screw thread in a direction toward the second end of the shank between a first apical angle and a second apical angle that is smaller than the first apical angle;

wherein the threading comprises at least one variation segment over which the decrease in the apical angle occurs, and at least one other segment over which the screw thread has a constant apical angle; and wherein the threading comprises a first segment extending from the variation segment and over which the screw thread has a constant apical angle equal to the first apical angle.

* * * * *